United States Patent
Lee et al.

(10) Patent No.: US 10,534,185 B1
(45) Date of Patent: Jan. 14, 2020

(54) MULTI-PLANAR DISPLAY WITH WAVEGUIDE AND LENS STACKS

(71) Applicant: Facebook Technologies, LLC, Menlo Park, CA (US)

(72) Inventors: Hee Yoon Lee, Redmond, WA (US); Douglas Robert Lanman, Bellevue, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 54 days.

(21) Appl. No.: 15/863,689

(22) Filed: Jan. 5, 2018

Related U.S. Application Data

(60) Provisional application No. 62/458,866, filed on Feb. 14, 2017.

(51) Int. Cl.
*H04N 9/14* (2006.01)
*G02B 27/01* (2006.01)
(Continued)

(52) U.S. Cl.
CPC ....... *G02B 27/0179* (2013.01); *G02B 6/0076* (2013.01); *G02B 27/0025* (2013.01); *G02B 27/0172* (2013.01); *G06F 3/013* (2013.01); *G02B 3/14* (2013.01); *G02B 2027/011* (2013.01); *G02B 2027/0125* (2013.01); *G02B 2027/0138* (2013.01); *G02B 2027/0185* (2013.01); *G02F 1/29* (2013.01); *G02F 2001/294* (2013.01)

(58) Field of Classification Search
CPC .. G02F 1/33; A61B 3/085; G02B 5/18; G02B 26/103; G02B 3/0006; G02B 3/14; G02B 7/36; G06F 3/013

USPC .................................. 348/349; 359/267, 573
See application file for complete search history.

(56) References Cited

U.S. PATENT DOCUMENTS

| 5,452,385 A | 9/1995 | Izumi et al. |
| 5,966,112 A | 10/1999 | Katagiri et al. |

(Continued)

OTHER PUBLICATIONS

"4K e-shift 3 Technology | DLA-X900R/Dla-X700R/DLA-XS00R | JVC," JVC Kenwood Corporation, undated, 5 pages, [Online] [Retrieved on Mar. 19, 2018] Retrieved from the Internet <URL:http://eu.jvc.com/microsite/eu/dla-x900r/feature01.html>.

*Primary Examiner* — Abdul-Samad A Adediran
(74) *Attorney, Agent, or Firm* — Fenwick & West LLP

(57) ABSTRACT

A near-eye display includes a display assembly, an eye tracking system, and a multifocal module. The display assembly emits image light at a particular focal distance in accordance with multifocal instructions. The display assembly includes focal adjustment lenses and waveguide displays arranged in optical series and configured to emit light in accordance with the multifocal instructions. Different combinations of focal adjustment lenses are associated with different focal distances. Each waveguide display is separated from one or more adjacent waveguide displays by one or more of the plurality of focal adjustment lenses, and is associated with a unique combination of one or more of the focal adjustment lenses and a corresponding focal distance. The eye tracking system determines eye tracking information for a user's eye. The multifocal module generates the multifocal instructions based on the eye tracking information and provides the multifocal instructions to the display assembly.

20 Claims, 6 Drawing Sheets

(51) Int. Cl.
   *F21V 8/00* (2006.01)
   *G02B 27/00* (2006.01)
   *G06F 3/01* (2006.01)
   *G02B 3/14* (2006.01)
   *G02F 1/29* (2006.01)

(56) References Cited

U.S. PATENT DOCUMENTS

| | | | |
|---|---|---|---|
| 6,429,913 B2 | 8/2002 | Putilin | |
| 8,233,204 B1 | 7/2012 | Robbins et al. | |
| 8,508,830 B1 * | 8/2013 | Wang | G02B 3/0006 359/267 |
| 9,762,851 B1 | 9/2017 | Baumert et al. | |
| 2002/0101643 A1 | 8/2002 | Kobayashi | |
| 2004/0160535 A1 | 8/2004 | Chuman et al. | |
| 2010/0245321 A1 | 9/2010 | Ogita et al. | |
| 2010/0246003 A1 | 9/2010 | Simmonds et al. | |
| 2010/0271537 A1 * | 10/2010 | Endoh | G02B 7/36 348/349 |
| 2012/0235886 A1 | 9/2012 | Border et al. | |
| 2013/0021226 A1 | 1/2013 | Bell | |
| 2013/0314793 A1 * | 11/2013 | Robbins | G02B 5/18 359/573 |
| 2014/0168260 A1 | 6/2014 | O'Brien et al. | |
| 2015/0015818 A1 | 1/2015 | Kim et al. | |
| 2015/0260995 A1 | 9/2015 | Mukawa | |
| 2016/0041384 A1 | 2/2016 | Robbins et al. | |
| 2016/0044276 A1 | 2/2016 | Shearman et al. | |
| 2016/0048017 A1 | 2/2016 | Kasahara et al. | |
| 2016/0055822 A1 | 2/2016 | Bell | |
| 2016/0241217 A1 | 8/2016 | Sazegar et al. | |
| 2016/0262608 A1 | 9/2016 | Krueger | |
| 2016/0270656 A1 * | 9/2016 | Samec | A61B 3/085 |
| 2016/0282635 A1 * | 9/2016 | Yang | G02B 3/14 |
| 2016/0286204 A1 * | 9/2016 | Grata | G02F 1/33 |
| 2016/0295202 A1 | 10/2016 | Evans et al. | |
| 2016/0306171 A1 | 10/2016 | Rudolph et al. | |
| 2016/0379606 A1 | 12/2016 | Kollin et al. | |
| 2017/0045746 A1 | 2/2017 | Ellsworth et al. | |
| 2017/0068311 A1 | 3/2017 | Evans et al. | |
| 2017/0097506 A1 * | 4/2017 | Schowengerdt | G02B 26/103 |
| 2018/0210195 A1 | 7/2018 | Chee et al. | |
| 2019/0041634 A1 | 2/2019 | Popovich et al. | |

\* cited by examiner

MULTI-PLANAR DISPLAY WITH WAVEGUIDE AND LENS STACKS

CROSS-REFERENCE TO RELATED APPLICATIONS

This application claims benefit of U.S. Provisional Patent Application Ser. No. 62/458,866, filed Feb. 14, 2017, which is hereby incorporated by reference in its entirety.

TECHNICAL FIELD

The present disclosure generally relates to controlling focus of displayed images in artificial reality systems, and specifically relates to a multi-planar display with waveguide and lens stacks.

BACKGROUND

One fundamental problem related to using binocular displays based on waveguides in artificial reality systems is the vergence-accommodation conflict (VAC). Eyes of a user wearing a near-eye-display (NED) having a binocular display are always focused at a fixed distance where a waveguide in the binocular display forms an image, which is referred to as an accommodation. On the other hand, perception of depth is introduced only by the binocular disparity between the two displays, which is referred to as a vergence. Typically, the user of the NED having the binocular display feels fatigue in its eyes when a difference between the accommodation depth and the vergence depth is more than approximately 0.5 diopter. For example, if a waveguide display forms an image at 0.5 diopter (i.e., effective depth of 2 meters), the user's eyes would be focused at the accommodation depth of 2 meters. Then, a range of depths expressed by the binocular disparity that can be achieved without eye fatigue is from infinity to 1 meter from the user's eyes, i.e., between 0 diopter and approximately 1 diopter. Therefore, it is desirable to increase the depth range of displayed images without causing fatigue in user's eyes, i.e., the VAC in relation to the displayed images needs to be further mitigated in artificial reality systems.

SUMMARY

Embodiments of the present disclosure support an eyeglass-type platform representing a near-eye-display (NED). The NED may be part of an artificial reality system. The NED includes a multi-planar display assembly, an eye tracking system, and a multifocal module. The multi-planar display assembly is configured to emit image light at a particular focal distance in accordance with multifocal instructions. The multi-planar display assembly includes a plurality of focal adjustment lenses that each impart a respective amount of optical power to the display assembly, and that different combinations of focal adjustment lenses are associated with different focal distances (i.e., a distance from the display assembly to an image plane). And the image light is presented to a user at the focal distance corresponding to the specific combination of focal adjustment lenses. The multi-planar display assembly further includes a plurality of waveguide displays arranged in optical series and configured to emit light in accordance with the multifocal instructions. Each of the waveguide displays are separated from one or more adjacent waveguide displays by one or more of the plurality of focal adjustment lenses, and each of the waveguide displays is associated with a unique combination of one or more of the focal adjustment lenses and a corresponding focal distance at which the image light is presented to a user. In some embodiments, the NED further includes an eye tracking system and a multifocal module. The eye tracking system determines eye tracking information for one or more eyes of the user of the NED. The multifocal module generates the multifocal instructions based on the eye tracking information, and provides the multifocal instructions to the display assembly.

The NED is configured to adjust focus of images displayed on the waveguide displays, based on the multifocal instructions. By adjusting focus of image light in accordance with the multifocal instructions, the NED can mitigate vergence-accommodation conflict. Furthermore, the NED can perform foveated rendering of the displayed images based on the determined eye tracking information. In some embodiments, a corrective optical element is coupled to a waveguide display of the plurality of waveguide displays being the furthest from the user's eye. An optical power of the corrective element may be selected such that an optical power of combination of the plurality of focal adjustment lenses and the corrective optical element is zero or approximately zero.

Figure 1:
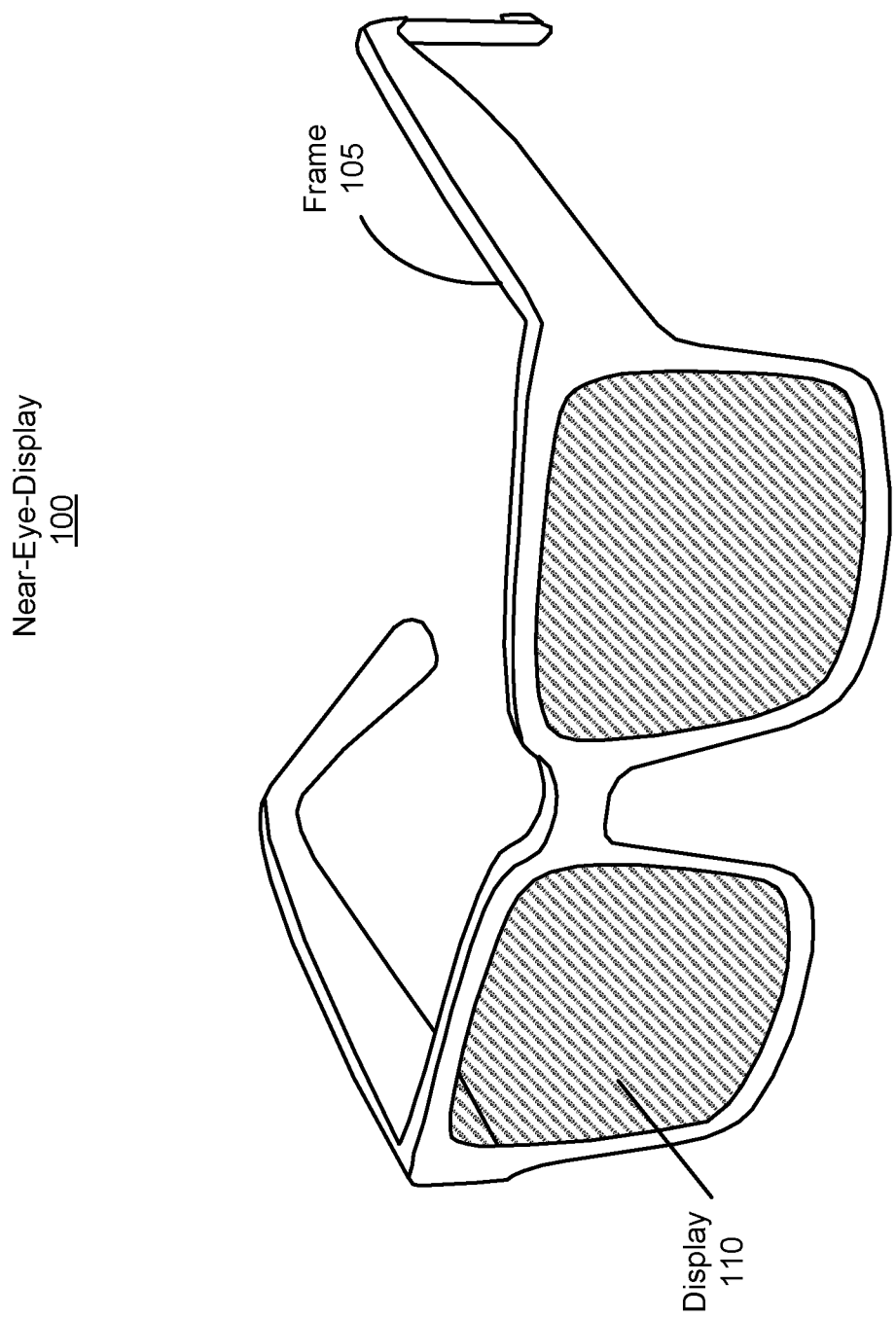
FIG. 1 is a diagram of a near-eye-display (NED), in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a near-eye-display (NED), a mobile device or computing system, or any other hardware platform capable of providing artificial reality content to one or more viewers.

Disclosed embodiments include a multifocal system integrated into a NED. The NED may be part of an artificial reality system. The NED may also be referred to as a HMD. The multifocal system is able to dynamically vary its focus in order to bring into focus images presented to a user wearing the NED. The multifocal system uses an eye tracker integrated into the NED to determine what angle the user is looking and adjusts the focus to ensure that an image presented to the user is in focus at the determined angle. The multifocal system includes one or more waveguide-lens stacks. A waveguide-lens stack includes a plurality of two-dimensional (2D) pupil expanding waveguide displays that are in a stack in optical series, and between any two adjacent waveguide displays in the stack there is a lens. As image light emitted from a particular waveguide display is transmitted through a unique combination of lenses, image light emitted from each waveguide display is associated with a different focal plane. In AR and MR systems, the waveguide-lens stack can also include a corrective lens to ensure light from a local area is not affected by the lenses within the waveguide-lens stack. Additionally, in some embodiments, a variable focal system can be created by using variable focus liquid crystal lenses or liquid lenses within the waveguide-lens stack instead of conventional lenses. Accordingly by being able to vary a focal distance for the image light, the multifocal system presented herein is able to control focus in order to mitigate potential problems with vergence-accommodation conflict (VAC) of the user's eyes.

A 2D pupil expanding waveguide display of the presented multifocal system generally forms a 2D image at infinity. Waveguide displays stacked in optical series can form different 2D images at different distances (depths) with an optical element (lens) inserted between each pair of adjacent waveguide displays. Due to the structure of a waveguide-lens stack, each waveguide display emits image light that is presented at different focal distances. Image light output from a first waveguide display integrated within the waveguide-lens stack that is furthest from user's eyes propagates through a plurality of lenses included in the waveguide-lens stack. A next second waveguide display closest to the first waveguide display outputs image light that propagates through all but one of the plurality of lenses. A waveguide display that is closest to the user's eyes outputs image light that propagates through one lens of the plurality of lenses. Thus, each waveguide display in the waveguide-lens stack forms an image at a unique depth. Optical powers of the plurality of lenses included in the waveguide-lens stack determine where multiple planes of images are located from the user's eyes.

FIG. 1 is a diagram of a NED 100, in accordance with one or more embodiments. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as a VR NED. However, in some embodiments, the NED 100 may be modified to also operate as an AR NED, a MR NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes a display assembly that generates an image light to present media to an eye of the user. The NED 100 shown in FIG. 1 is only an example of an artificial reality system. However, in alternate embodiments, the NED 100 may also be referred to as a HMD.

Figure 2:
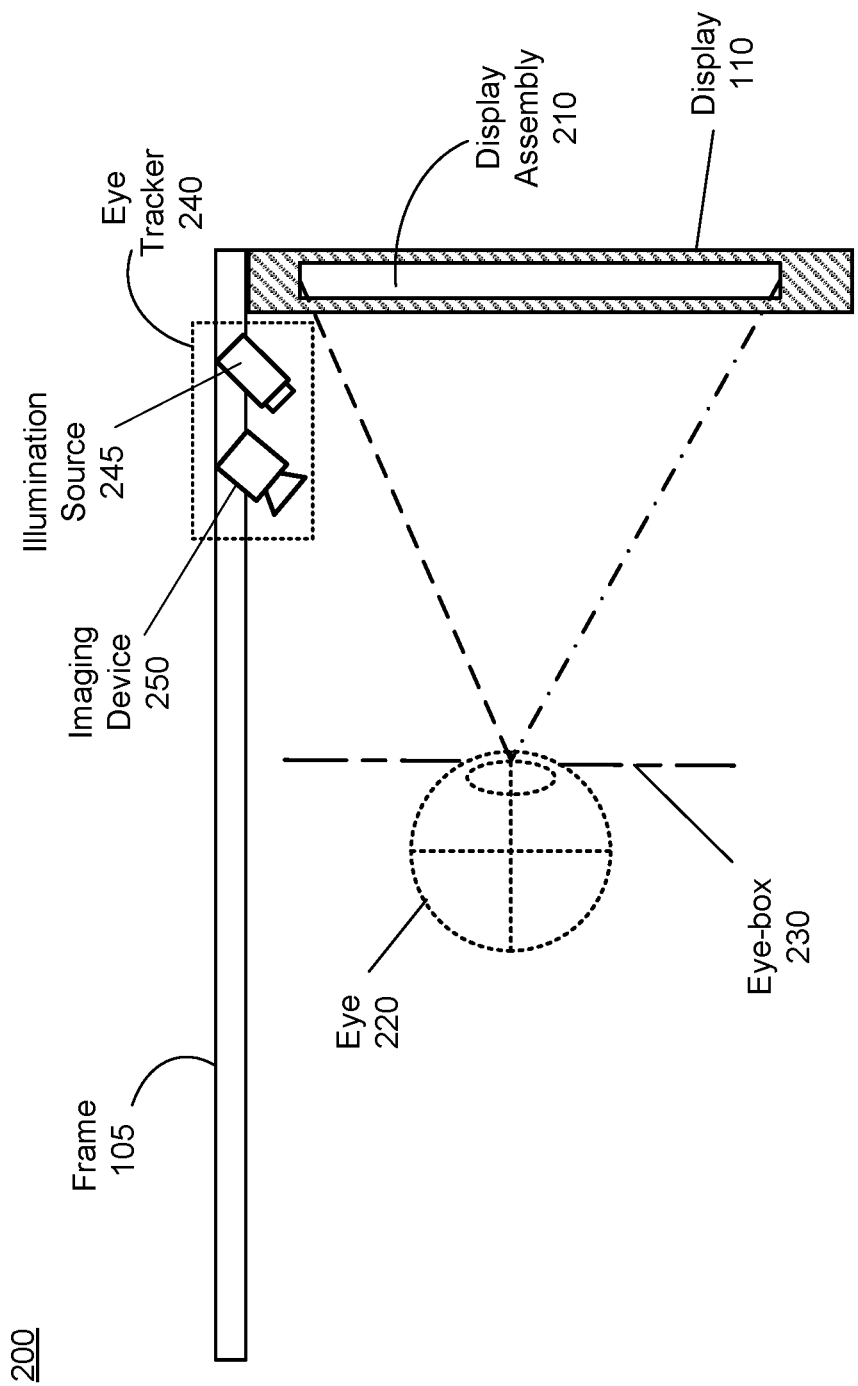
FIG. 2 is a cross-section of an eyewear of the NED in FIG. 1, in accordance with one or more embodiments.

FIG. 2 is a cross section 200 of an eyewear of the NED 100 illustrated in FIG. 1, in accordance with one or more embodiments. The cross section 200 includes at least one display assembly 210 integrated into the display 110, an eye-box 230, and an eye tracker 240. The eye-box 230 is a location where an eye 220 is positioned when the user wears the NED 100. In some embodiments, the frame 105 may represent a frame of eye-wear glasses. For purposes of illustration, FIG. 2 shows the cross section 200 associated with a single eye 220 and a single display assembly 210, but in alternative embodiments not shown, another display assembly which is separate from the display assembly 210 shown in FIG. 2, provides image light to another eye 220 of the user.

The display assembly 210 is configured to direct the image light to the eye 220 through the eye-box 230. The display assembly 210 is implemented as a multi-planar display assembly configured to emit image light at a particular focal distance in accordance with multifocal instructions, e.g., provided from a multifocal module (not shown in FIG. 2). A focal distance is an effective distance from a specific display of the multi-planar display assembly 210 to a plane at which content is presented to the user. In some embodiments, the display assembly 210 comprises a multifocal system that is able to dynamically vary its focus in order to bring into focus images presented to the user. The multifocal system includes one or more waveguide-lens stacks. A waveguide-lens stack includes a plurality of waveguide displays arranged in optical series, and between any two adjacent waveguide displays in the stack there is a lens. As image light emitted from a particular waveguide display is transmitted through a unique combination of lenses, image light emitted from each waveguide display is associated with a different focal plane. The multifocal system of the display assembly 210 uses the eye tracker 240 to determine an angle of eye-gaze and adjusts the focus to ensure that an image presented to the user is in focus at the determined angle. By varying a focal distance for the image light, the multifocal system of the display assembly 210 is able to control focus and mitigate the VAC in relation to image light. The multifocal module is configured to generate the multifocal instructions based on eye tracking information determined by the eye tracker 240 (e.g., an angle of eye-gaze). The multifocal module provides the multifocal instructions to the display assembly 210.

The multifocal system of the display assembly 210 may include one or more waveguide-lens stacks, and each waveguide-lens stack may include a plurality of waveguide displays and a plurality of focal adjustment lenses. Each of the focal adjustment lenses imparts a respective amount of optical power to the display assembly 210, such that different combinations of focal adjustment lenses are associated with different focal distances the image light is presented to a user. A focal adjustment lens can be defined as a lens that adjusts (i.e., removes or adds) optical power. The plurality of waveguide displays are arranged in optical series and configured to emit light in accordance with the multifocal instructions. Each of the waveguide displays are separated from one or more adjacent waveguide displays by one or more of the plurality of focal adjustment lenses, and each of the waveguide displays is associated with a unique combination of one or more of the focal adjustment lenses and a corresponding focal distance at which the image light is presented to the user. Each focal adjustment lens may have different optical powers, and can be combinations of negative and positive lenses. The multifocal system of the display assembly 210 is discussed in more detail below in conjunction with FIGS. 3-4.

The display assembly 210 may be composed of one or more materials (e.g., plastic, glass, etc.) with one or more refractive indices that effectively minimize the weight and widen a field of view of the NED 100. In alternate configurations, the NED 100 includes one or more optical elements between the display assembly 210 and the eye 220. The optical elements may act to, e.g., correct aberrations in image light emitted from the display assembly 210, magnify image light emitted from the display assembly 210, perform some other optical adjustment of image light emitted from the display assembly 210, or some combination thereof. The example for optical elements may include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects image light emitted from the display assembly 210.

In some embodiments, the NED 100 further includes the eye tracker 240 for determining and tracking a position and orientation of the eye 220, i.e., an angle of eye-gaze. Based on the determined and tracked position and orientation of the eye 220, the NED 100 adjusts presentation of an image displayed on a display of the display assembly 210. In some embodiments, the NED 100 adjusts focus of the displayed image and ensures that the image is in focus at the determined angle of eye-gaze in order to mitigate the VAC. Additionally or alternatively, the NED 100 adjusts resolution of the displayed image by performing foveated rendering of the image, based on the orientation of the eye 220. A maximum resolution for displaying the image on the display of the display assembly 210 can be provided in a foveal region of the eye-gaze, whereas a lower resolution is used in other regions of the display, without negatively affecting the user's visual experience.

In some embodiments, as shown in FIG. 2, the eye tracker 240 includes an illumination source 245 and an imaging device (camera) 250 that are coupled to the frame 105. In alternate embodiments, the illumination source 245 and the imaging device 250 can be integrated into the frame 105, and the imaging device 250 can be positioned on a side of the frame 105 opposite to the illumination source 245 (not shown in FIG. 2). In yet another embodiment, the eye tracker 240 comprising the illumination source 245 and the imaging device 250 can be included into an optical assembly (not shown in FIG. 2) positioned between the display assembly 210 and the exit pupil 230. The illumination source 245 and the imaging device 250 are positioned outside a line of sight of the eye 220, i.e., the eye tracker 240 is hidden from the user's sight. Light emitted from the illumination source 245 reflects from at least one surface of the eye 220, and the reflected light is captured by the imaging device 250. In an embodiment, light emitted from the illumination source 245 is infrared (IR) light and the imaging device 250 comprises a camera configured to capture images in the IR. The eye tracker 240 determines eye tracking information associated with the eye 220 based on the light reflected from the at least one surface of the eye 220 and captured by the imaging device 250. In an embodiment, light emitted from the illumination source 245 is structured light. In this case, the eye tracker 240 can determine an orientation of the eye 220 (i.e., an angle of eye-gaze) based on distortions in reflected structured light captured by the imaging device 250. In other embodiment, the eye tracker 240 determines an orientation of the eye 220 based on magnitudes of light reflected from the at least one surface of the eye 220 and captured by the imaging device 250 over a plurality of time instants.

Figure 3:
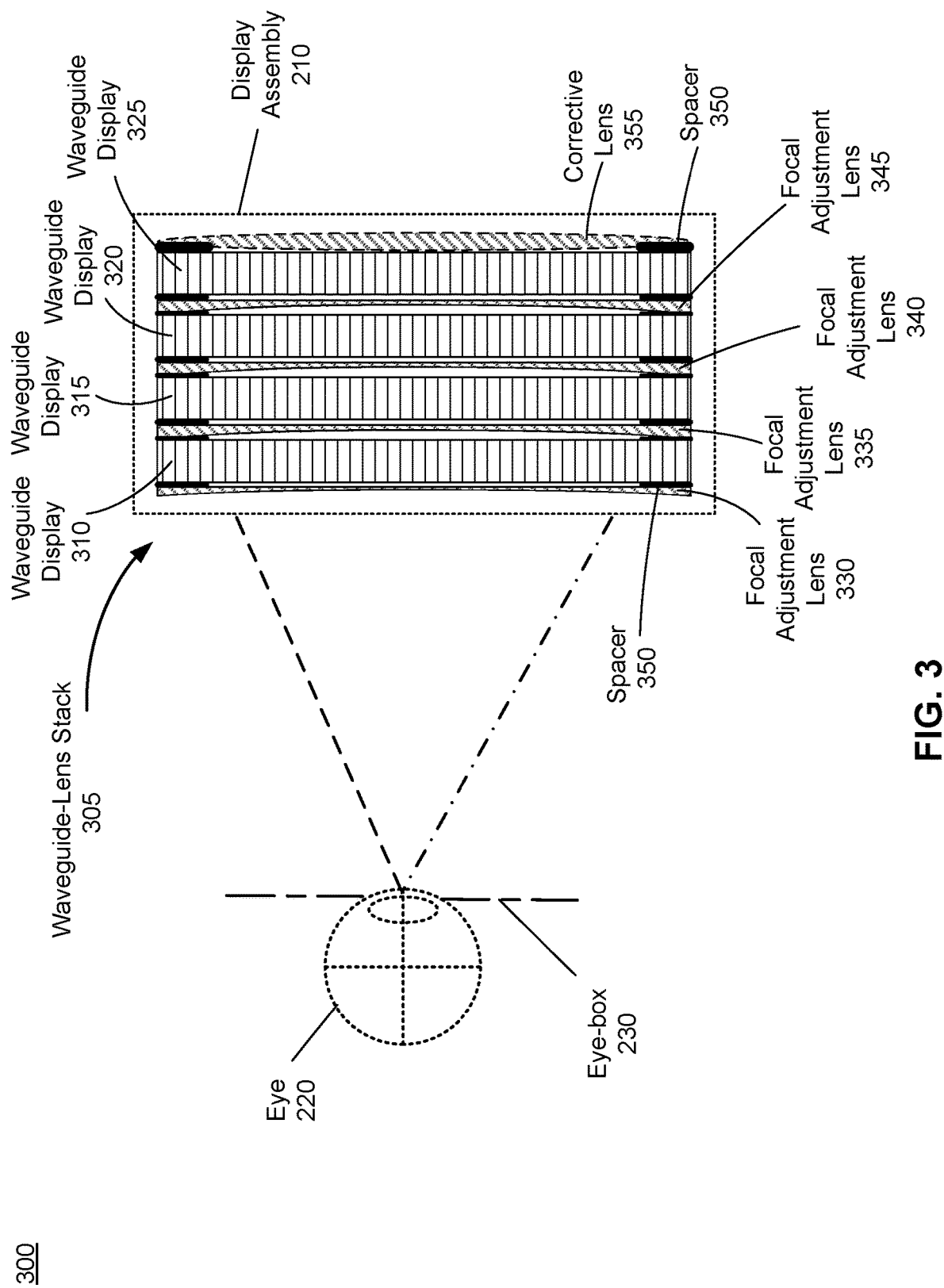
FIG. 3 is a cross-section of a display assembly of the NED in FIG. 1, in accordance with one or more embodiments.

FIG. 3 is a cross-section 300 of the display assembly 210 in FIG. 2, in accordance with one or more embodiments. An embodiment of the display assembly 210 shown in FIG. 3 comprises a waveguide-lens stack 305, which includes four 2D pupil expanding waveguide displays 310, 315, 320, 325 that are in optical series within the waveguide-lens stack 305. The embodiment shown in FIG. 3 is only illustrative. In the embodiment shown in FIG. 3, one focal adjustment lens 330, 335, 340, 345 is placed in front of each waveguide display 310, 315, 320, 325 in the waveguide-lens stack 305. The focal adjustment lenses 330, 335, 340, 345 may be glued to the waveguide displays 310, 315, 320, 325 via spacers 350, as shown in FIG. 3. The focal adjustment lenses 330, 335, 340, 345 integrated into the waveguide-lens stack 305 have certain optical powers that determine where an image from each waveguide display 310, 315, 320, 325 is formed, i.e., where multiple planes of images are located from the eye-box 230 of the eye 220. In the illustrative embodiment in FIG. 3, each of focal adjustment lenses 330, 335, 340, 345 is a concave lens that removes optical power.

For example, the focal adjustment lens 330 positioned in front of the waveguide display 310 has an optical power of −0.5 diopter. Image light emitted from the waveguide display 310 is transmitted through the focal adjustment lens 330 and forms an image at +0.5 diopter from the eye-box 230 of the eye 220, which covers a depth range between infinity and 1 meter from the eye-box 230. The focal adjustment lens 335 that is positioned between the waveguide display 310 and the waveguide display 315 has an optical power of −1.0 diopter. Image light emitted from the waveguide display 315 is transmitted though the focal adjustment lenses 335, 330 and forms an image at +1.5 diopter from the eye-box 230, which covers a depth range between 1 meter and 50 cm from the eye-box 230. The focal adjustment lens 340 that is positioned between the waveguide display 315 and the waveguide display 320 has an optical power of −1.0 diopter. Image light emitted from the waveguide display 320 is transmitted though the focal adjustment lenses 340, 335, 330 and forms an image at +2.5 diopter from the eye-box 230, which covers a depth range between 50 cm and 33 cm from the eye-box 230. The focal adjustment lens 345 that is positioned between the waveguide display 320 and the waveguide display 325 has an optical power of −1.0 diopter. Image light emitted from the waveguide display 325 is transmitted though the focal adjustment lenses 345, 340, 335, 330 and forms an image at +3.5 diopter from the eye-box 230, which covers a depth range between 33 cm and 25 cm from the exit pupil 230. Thus, the focal adjustment lenses 330, 335, 340, 345 integrated into the waveguide-lens stack 305 of the display assembly 210 provide four focal planes that cover four diopters, i.e., ranges of depth from infinity to 25 cm from the eye-box 230 of the user's eye 220. Note that a thickness of each focal adjustment lens 330, 335, 340, 345 is less than 0.5 mm due to a relatively small optical power of each focal adjustment lens.

In some embodiments, especially in AR and MR systems, the waveguide-lens stack 305 further includes a convex corrective lens 355 positioned behind the waveguide display 325, i.e., the corrective lens 355 is positioned furthest from the eye-box 230 of the eye 220. In these embodiments, light from a local (surrounding) area passes through the corrective lens 355 and the focal adjustment lenses 330, 335, 340, 345 before being presented to the eye 220. The corrective lens 355 has an optical power that offsets adjustments in optical power to the light from the local (surrounding) area caused by the focal adjustment lenses. In the illustrative embodiment shown in FIG. 3, the corrective convex lens 355 has an optical power of +3.5 diopter. Thus, the sum of optical powers of the focal adjustment lenses 330, 335, 340, 345 and the corrective convex lens 355 is 0 diopter, i.e., light from the surrounding area is not affected when propagates through the corrective lens 355 and the focal adjustment lenses 330, 335, 340, 345 of the waveguide-lens stack 305 to the eye-box 230 of the user's eye 220. Note that a thickness of the corrective lens 355 having the optical power of +3.5 diopter is somewhat larger than a thickness of any of the focal adjustment lens 330, 335, 340, 345 due to a larger optical power of the corrective lens 355. In some embodiments, the thickness of the corrective lens 355 is below a defined upper bound, by e.g., using a high index material.

In some embodiments, instead of using conventional lenses with fixed optical powers, each focal adjustment lens 330, 335, 340, 345 integrated within the waveguide-lens stack 305 can be implemented as a liquid crystal lens or a liquid lens with a variable optical power providing images with variable focus. Due to a variable optical power of a liquid crystal lens (and of a liquid lens), a number of waveguide displays and focal adjustment lenses within a waveguide-lens stack can be reduced to provide same or even larger number of focal planes compared to that when a waveguide-lens stack with conventional lenses is used within a display assembly. In an illustrative embodiment, instead of using four waveguide displays and four different conventional focal adjustment lenses within the waveguide-lens stack 305 to provide four different focal planes as shown in FIG. 3, only two waveguide displays can be stacked with two liquid crystal lenses (or two liquid lenses), wherein each liquid crystal lens (or each liquid lens) provides at least two different optical powers. In addition, in order to ensure that light from the surrounding area is not affected by the liquid crystal lenses (or the liquid lenses) integrated into the waveguide-lens stack 305, the corrective lens 355 may be also implemented as a liquid crystal lens (or a liquid lens) having a variable optical power.

Figure 4:
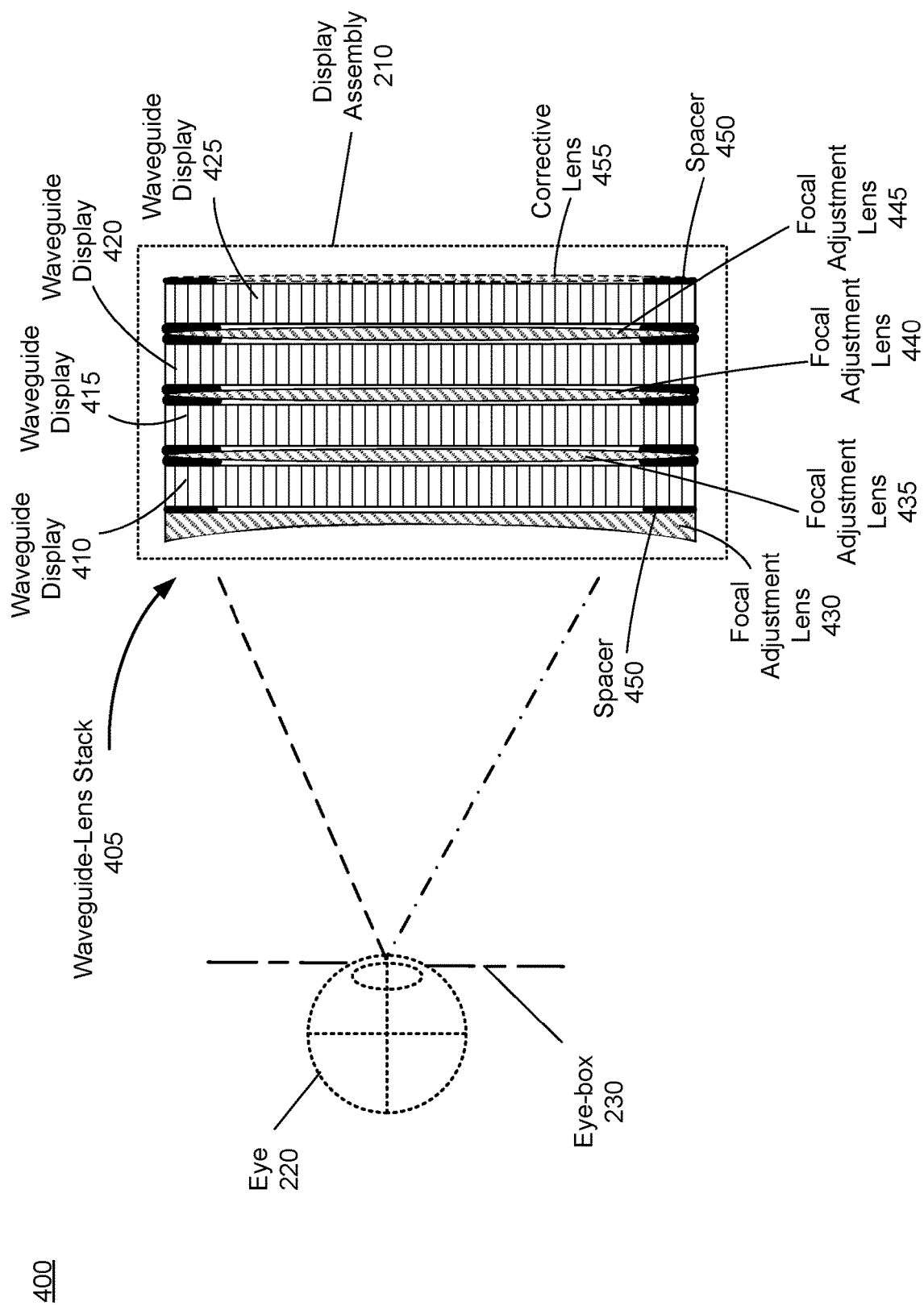
FIG. 4 is a cross-section of another display assembly of the NED in FIG. 1, in accordance with one or more embodiments.

FIG. 4 is a cross-section 400 of the display assembly 210 in FIG. 2, in accordance with one or more embodiments. An embodiment of the display assembly 210 shown in FIG. 4 comprises a waveguide-lens stack 405, which includes four 2D pupil expanding waveguide displays 410, 415, 420, 425 that are in optical series within the waveguide-lens stack 405. The embodiment shown in FIG. 4 is only illustrative. In the embodiment shown in FIG. 4, one focal adjustment lens 430, 435, 440, 445 is placed in front of each waveguide display 410, 415, 420, 425 in the waveguide-lens stack 405. The focal adjustment lenses 430, 435, 440, 445 may be glued to the waveguide displays 410, 415, 420, 425 via spacers 450, as shown in FIG. 4. The structure of the waveguide-lens stack 405 in FIG. 4 is substantially the same as the structure of the waveguide-lens stack 305 in FIG. 3 except that each of the focal adjustment lens 435, 440, 445 is a convex lens that adds optical power. The focal adjustment lens 430 placed closest to the eye 220 is a concave lens, and the focal adjustment lens 430 removes optical power.

For example, the focal adjustment lens 430 positioned in front of the waveguide display 410 has an optical power of −3.5 diopter. Image light emitted from the waveguide display 410 is transmitted only through the focal adjustment lens 430 and forms an image at +3.5 diopter from the eye-box 230 of the eye 220, which covers a depth range between 33 cm and 25 cm from the eye-box 230. The focal adjustment lens 435 that is positioned between the waveguide display 410 and the waveguide display 415 has an optical power of +1.0 diopter. Image light emitted from the waveguide display 415 is transmitted though the focal adjustment lenses 435, 430 and forms an image at +2.5 diopter from the eye-box 230, which covers a depth range between 50 cm and 33 cm from the eye-box 230. The focal adjustment lens 440 that is positioned between the waveguide display 415 and the waveguide display 420 has an optical power of +1.0 diopter. Image light emitted from the waveguide display 420 is transmitted though the focal adjustment lenses 440, 435, 430 and forms an image at +1.5 diopter from the eye-box 230, which covers a depth range between 1 meter and 50 cm from the eye-box 230. The focal adjustment lens 445 that is positioned between the waveguide display 420 and the waveguide display 425 has an optical power of +1.0 diopter. Image light emitted from the waveguide display 425 is transmitted though the focal adjustment lenses 445, 440, 435, 430 and forms an image at +0.5 diopter from the eye-box 230, which covers a depth range between infinity and 1 meter from the eye-box 230. Thus, the focal adjustment lenses 430, 435, 440, 445 integrated into the waveguide-lens stack 405 of the display assembly 210 provide four focal planes that cover four diopters, i.e., ranges of depth from infinity to 25 cm from the eye-box 230 of the eye 220. Note that a thickness of each focal adjustment lens 435, 440, 445 is less than 0.5 mm due to a relatively small optical power of each focal adjustment lens. A thickness of the focal adjustment lens 430 is somewhat larger than a thickness of any of the focal adjustment lenses 435, 440, 445 due to a larger optical power of the concave lens 430. In some embodiments, the thickness of the focal adjustment lens 430 is below a defined upper bound, by e.g., using a high index material In some embodiments, especially in AR and MR systems, the waveguide-lens stack 405 further includes a convex corrective lens 455 positioned behind the waveguide display 425, i.e., the corrective lens 455 is positioned furthest from the eye-box 230 of the eye 220. The corrective lens 455 has an optical power such that to ensure that light from a local (surrounding) area is not affected by the focal adjustment lenses 430, 435, 440, 445 within the waveguide-lens stack 405. In the illustrative embodiment shown in FIG. 4, the corrective lens 455 is a convex lens with an optical power of +0.5 diopter. Thus, the sum of optical powers of the focal adjustment lenses 430, 435, 440, 445 and the corrective lens 455 is 0 diopter, i.e., light from the surrounding area is not affected when propagates through the corrective lens 455 and the focal adjustment lenses 430, 435, 440, 445 of the waveguide-lens stack 405 to the eye-box 230 of the user's eye 220. Note that a thickness of the corrective convex lens

455 having the optical power of +0.5 diopter is smaller than 0.5 mm due to a relatively small optical power.

In some embodiments, as discussed, instead of using conventional lenses with fixed optical powers, each focal adjustment lens 430, 435, 440, 445 integrated within the waveguide-lens stack 405 can be implemented as a liquid crystal lens or a liquid lens with a variable optical power providing images with variable focus. Due to a variable optical power of a liquid crystal lens (and of a liquid lens), a number of waveguide displays and lenses within a waveguide-lens stack can be reduced to provide same or even larger number of focal planes compared to that when a waveguide-lens stack with conventional focal adjustment lenses is used within a display assembly. In an illustrative embodiment, instead of using four waveguide displays and four different conventional focal adjustment lenses within the waveguide-lens stack 405 to provide four different focal planes as shown in FIG. 4, only two waveguide displays can be stacked with two liquid crystal lenses (or two liquid lenses), wherein each liquid crystal lens (or each liquid lens) provides at least two different optical powers. In addition, in order to ensure that light from the surrounding area is not affected by the liquid crystal lenses (or the liquid lenses) integrated into the waveguide-lens stack 405, the corrective lens 455 may be also implemented as a liquid crystal lens (or a liquid lens) having a variable optical power.

In some embodiments, the display assembly 210 comprises a multifocal module (not shown in FIGS. 2-4) configured to adjust presentation of images displayed to a user. The multifocal module may adjust focuses of the displayed images to mitigate the VAC. In the embodiments where the focal adjustment lenses of the display assembly 210 are implemented as liquid crystal lenses (or liquid lenses) with variable optical powers, the multifocal module can be configured to control an optical power of each liquid crystal lens (or each liquid lens) included into the display assembly 210 in order to control a focal distance for image light emitted from each waveguide display of the display assembly 210. In one embodiment, the multifocal module controls an optical power of each liquid crystal lens based in part on multifocal instructions that include, e.g., information about voltage levels to be applied at each liquid crystal lens for varying an optical power of that liquid crystal lens. In other embodiment, the multifocal module controls an optical power of each liquid lens included into the display assembly 210 based in part on the multifocal instructions. Each liquid lens may consist of liquid material (e.g., liquid glycerin) enclosed between two flexible rubber membranes. The multifocal module may instruct, via the multifocal instructions, a mechanical actuator coupled to the liquid lens (not shown in FIGS. 3-4) to adjust a curvature of the liquid lens for varying an optical power of the liquid lens. Additionally or alternatively, the multifocal module adjusts focus of images displayed on waveguide displays in the display assembly 210 by performing foveated rendering of the images based on eye tracking information (e.g., an angle of eye-gaze) determined by the eye tracker 240 in FIG. 2. In this case, the multifocal module may be coupled to the eye tracker 240 or integrated within the eye tracker 240.

Figure 5:
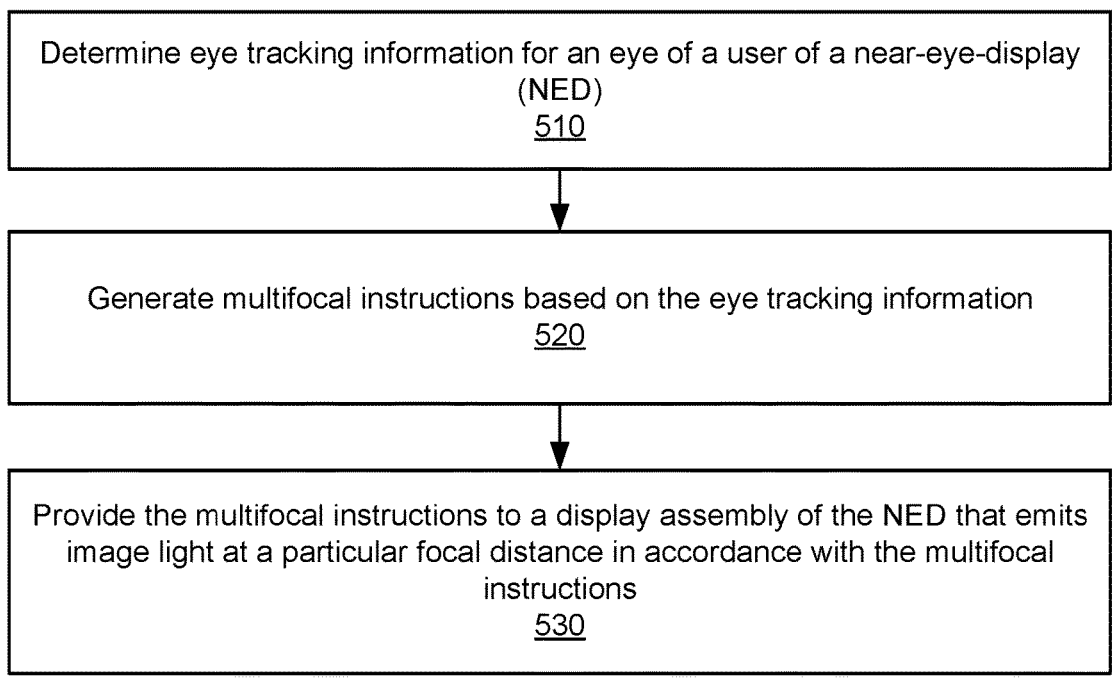
FIG. 5 is a flow chart illustrating a process of multi-planar displaying of images, which may be implemented at the NED shown in FIG. 1, in accordance with one or more embodiments.

FIG. 5 is a flow chart illustrating a process 500 of multi-planar displaying of images, which may be implemented at the NED 100 shown in FIG. 1, in accordance with one or more embodiments. The process 500 of FIG. 5 may be performed by the components of a NED (e.g., the NED 100). Other entities may perform some or all of the steps of the process in other embodiments. Likewise, embodiments may include different and/or additional steps, or perform the steps in different orders.

The NED determines 510 (e.g., via an eye tracking system) eye tracking information for an eye of a user of the NED. The determined eye tracking information may comprise information about a position and orientation of the user's eye in an eye-box, i.e., information about an angle of an eye-gaze. In an embodiment, the user's eye may be illuminated with structured light. Then, the eye tracking system can use distortions in reflected structured light in a captured image to determine eye position and eye-gaze. In another embodiment, the eye tracking system may determine eye position and eye-gaze based on magnitudes of image light captured over a plurality of time instants.

The NED generates 520 (e.g., via a multifocal module coupled to the eye tracking system) multifocal instructions based on the eye tracking information. The NED may determine (e.g., via the multifocal module) a focal distance associated with the user's eye using the determined eye tracking information. In some embodiments, the NED determines the focal distance based on the eye position and eye-gaze relative to each waveguide display of a plurality of waveguide displays in a display assembly of the NED. The NED may select (e.g., via the multifocal module) a waveguide display of the plurality of the waveguide displays that presents image light closest to the focal distance. In some embodiments, the NED compares the determined focal distance to a table of available focal distances (e.g., stored at a memory of the controller), and selects the one that is the closest to the determined focal distance. The NED generates 520 the multifocal instructions comprising instructions related to the selected waveguide display to emit image light.

The NED provides 530 the multifocal instructions to a display assembly that emits image light at a particular focal distance in accordance with the multifocal instructions. The NED may instruct the selected waveguide display to emit image light in accordance with the multifocal instructions. In the case of a fluidic (liquid) lens or a liquid crystal lens, the NED dynamically causes the fluidic lens or the liquid crystal lens to adjust its optical power to the correct focal distance, based in part on the multifocal instructions.

The display assembly includes a plurality of focal adjustment lenses that each imparts a respective amount of optical power to the display assembly, and that different combinations of focal adjustment lenses are associated with different focal distances. The display assembly further includes the plurality of waveguide displays arranged in optical series and configured to emit light in accordance with the multifocal instructions. Each of the waveguide displays is separated from one or more adjacent waveguide displays by one or more of the plurality of focal adjustment lenses, and each of the waveguide displays is associated with a unique combination of one or more of the focal adjustment lenses and a corresponding focal distance at which the image light is presented to the user.

The NED presents image light using the selected waveguide display. The selected waveguide display emits the image light towards an eye of a user wearing the NED. The image light propagates through a combination of focal adjustment lenses of the display assembly towards the user's eye. In an embodiment, the NED provides optical correction to the image light, e.g., based on an optical prescription of the user.

System Environment

Figure 6:
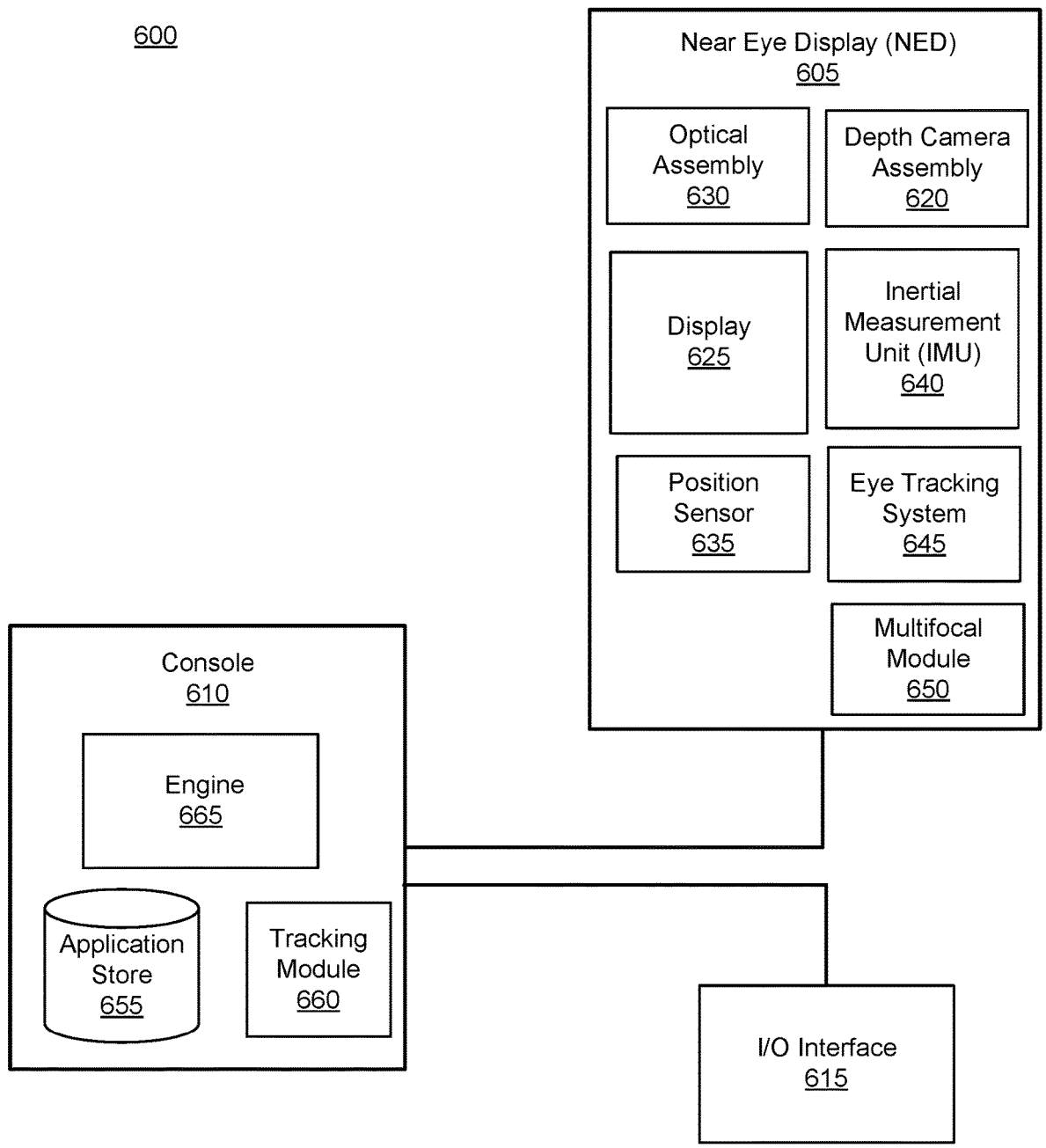
FIG. 6 is a block diagram of a system environment that includes the NED shown in FIG. 1, in accordance with one or more embodiments.

FIG. 6 is a block diagram of one embodiment of a NED system 600 in which a console 610 operates, in accordance with one or more embodiments. The NED system 600 may operate in an artificial system environment. The NED system 600 shown by FIG. 6 comprises a NED 605 and an input/output (I/O) interface 615 that is coupled to the console 610. While FIG. 6 shows an example NED system 600 including one NED 605 and on I/O interface 615, in other embodiments any number of these components may be included in the NED system 600. For example, there may be multiple NEDs 605 each having an associated I/O interface 615, with each NED 605 and I/O interface 615 communicating with the console 610. In alternative configurations, different and/or additional components may be included in the NED system 600. Additionally, functionality described in conjunction with one or more of the components shown in FIG. 6 may be distributed among the components in a different manner than described in conjunction with FIG. 6 in some embodiments. For example, some or all of the functionality of the console 610 is provided by the NED 605.

The NED 605 is a near-eye display or a head-mounted display that presents content to a user comprising virtual and/or augmented views of a physical, real-world environment with computer-generated elements (e.g., 2D or 3D images, 2D or 3D video, sound, etc.). In some embodiments, the presented content includes audio that is presented via an external device (e.g., speakers and/or headphones) that receives audio information from the NED 605, the console 610, or both, and presents audio data based on the audio information. The NED 605 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the NED 605 is the NED 100 described above in conjunction with FIG. 1.

The NED 605 may include a DCA 620, a display 625, an optical assembly 630, one or more position sensors 635, an IMU 640, an eye tracking system 645, and a multifocal module 650. In some embodiments, the display 625 and the optical assembly 630 can be together integrated into one or more waveguide-lens stacks, as described above in conjunction with FIGS. 3-4. Some embodiments of the NED 605 have different components than those described in conjunction with FIG. 6. Additionally, the functionality provided by various components described in conjunction with FIG. 6 may be differently distributed among the components of the NED 605 in other embodiments.

The DCA 620 captures data describing depth information of an area surrounding the NED 605. The data describing depth information may be associated with one or a combination of the following techniques used to determine depth information: structured light, time of flight, or some combination thereof. The DCA 620 can compute the depth information using the data, or the DCA 620 can send this information to another device such as the console 410 that can determine the depth information using data from the DCA 620.

The DCA 620 includes an illumination source, an imaging device, and a controller. The illumination source emits light onto an area surrounding the NED 605. In an embodiment, the emitted light is a structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the illumination source can emit light having a structured light pattern. The imaging device captures ambient light and light from one or more emitters of the plurality of emitters of the plurality of emitters that is reflected from objects in the area. The imaging device may be an infrared camera or a camera configured to operate in a visible spectrum. The controller coordinates how the illumination source emits light and how the imaging device captures light. In some embodiments, the controller also determines depth information associated with the local area using the captured images.

The display 625 displays 2D or 3D images to the user in accordance with data received from the console 610. In various embodiments, the display 625 comprises a single display or multiple displays (e.g., a display for each eye of a user). In some embodiments, the display 625 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, one or more waveguides, some other display, a scanner, 1D array, or some combination thereof. An embodiment of the display 625 is the display assembly 210 described above in conjunction with FIG. 2. The display 625 includes a plurality of 2D waveguide displays in optical series and a plurality of focal adjustment lenses, as described above in conjunction with FIGS. 3-4. Each focal adjustment lens imparts a respective amount of optical power to the display 625, and that different combinations of focal adjustment lenses are associated with different focal distances. The waveguide displays are arranged in optical series and configured to emit light in accordance with multifocal instructions (e.g., from the multifocal module 650). Each of the waveguide displays is separated from one or more adjacent waveguide displays by one or more of the plurality of focal adjustment lenses, and each of the waveguide displays is associated with a unique combination of one or more of the focal adjustment lenses and a corresponding focal distance at which the image light is presented to a user. In AR and MR environments, the display 625 may include a corrective optical element selected in a manner such that light from a local area surrounding the NED 605 is not affected by the plurality of focal adjustment lenses and the corrective optical element.

The optical assembly 630 magnifies image light received from the display 625, corrects optical errors associated with the image light, and presents the corrected image light to a user of the NED 605. The optical assembly 630 includes a plurality of optical elements. Example optical elements included in the optical assembly 630 include: an aperture, a Fresnel lens, a convex lens, a concave lens, a filter, a reflecting surface, or any other suitable optical element that affects image light. Moreover, the optical assembly 630 may include combinations of different optical elements. In some embodiments, one or more of the optical elements in the optical assembly 630 may have one or more coatings, such as partially reflective or anti-reflective coatings.

Magnification and focusing of the image light by the optical assembly 630 allows the display 625 to be physically smaller, weigh less and consume less power than larger displays. Additionally, magnification may increase the field of view of the content presented by the display 625. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 630 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display 625 for display is pre-distorted, and the optical assembly 630 corrects the distortion when it receives image light from the display 625 generated based on the content. In some embodiments, as discussed in conjunction with FIGS. 3-4, elements of the optical assembly 630 may be integrated into the display 625 comprising a plurality of waveguide displays in optical series.

The IMU 640 is an electronic device that generates data indicating a position of the NED 605 based on measurement signals received from one or more of the position sensors 635 and from depth information received from the DCA 620. A position sensor 635 generates one or more measurement signals in response to motion of the NED 605. Examples of position sensors 635 include: one or more accelerometers, one or more gyroscopes, one or more magnetometers, another suitable type of sensor that detects motion, a type of sensor used for error correction of the IMU 640, or some combination thereof. The position sensors 635 may be located external to the IMU 640, internal to the IMU 640, or some combination thereof.

Based on the one or more measurement signals from one or more position sensors 635, the IMU 640 generates data indicating an estimated current position of the NED 605 relative to an initial position of the NED 605. For example, the position sensors 635 include multiple accelerometers to measure translational motion (forward/back, up/down, left/right) and multiple gyroscopes to measure rotational motion (e.g., pitch, yaw, roll). In some embodiments, the IMU 640 rapidly samples the measurement signals and calculates the estimated current position of the NED 605 from the sampled data. For example, the IMU 640 integrates the measurement signals received from the accelerometers over time to estimate a velocity vector and integrates the velocity vector over time to determine an estimated current position of a reference point on the NED 605. Alternatively, the IMU 640 provides the sampled measurement signals to the console 610, which interprets the data to reduce error. The reference point is a point that may be used to describe the position of the NED 605. The reference point may generally be defined as a point in space or a position related to the NED's 605 orientation and position.

The IMU 640 receives one or more parameters from the console 610. The one or more parameters are used to maintain tracking of the NED 605. Based on a received parameter, the IMU 640 may adjust one or more IMU parameters (e.g., sample rate). In some embodiments, certain parameters cause the IMU 640 to update an initial position of the reference point so it corresponds to a next position of the reference point. Updating the initial position of the reference point as the next calibrated position of the reference point helps reduce accumulated error associated with the current position estimated the IMU 640. The accumulated error, also referred to as drift error, causes the estimated position of the reference point to "drift" away from the actual position of the reference point over time. In some embodiments of the NED 605, the IMU 640 may be a dedicated hardware component. In other embodiments, the IMU 640 may be a software component implemented in one or more processors.

The eye tracking system 645 determines eye tracking information associated with an eye of a user wearing the NED 605. The eye tracking information determined by the eye tracking system 645 may comprise information about an orientation of the user's eye, i.e., information about an angle of an eye-gaze. In some embodiments, the eye tracking system 645 is integrated into the optical assembly 630. An embodiment of the eye-tracking system 645 is the eye tracker 240 described above in conjunction with FIG. 2, and may comprise an illumination source and an imaging device (camera).

The multifocal module 650 analyzes the eye tracking information from the eye tracking system 645 to identify a focal distance to present image content. The multifocal module 650 further determines which waveguide display to emit image light at based on the determined focal distance. The multifocal module 650 generates multifocal instructions comprising instructions related to the selected waveguide display to emit image light. The multifocal module 650 then provides the multifocal instructions to the display 625. In the case where the focal adjustment lenses are implemented as liquid crystal lenses (or liquid lens), the multifocal module 650 dynamically causes each of the liquid crystal lenses (or each of the liquid lenses) to adjust its optical power to the correct focal distance. In this way, the multifocal module 650 may control a focal distance for image light emitted from each waveguide display of the display 625, thus providing a different focal plane associated with image light emitted from a different waveguide display of the display 625, which prevents the VAC. In some embodiments, the multifocal module 650 may be configured to adjust resolution of images displayed on the display 625 by performing foveated rendering of the displayed images, based at least in part on the determined eye tracking information obtained from the eye tracking system 645. In this case, the multifocal module 650 provides appropriate image signals to the display 625. The multifocal module 650 provides image signals with a maximum resolution for the display 625 in a foveal region of the user's eye-gaze, while providing image signals with lower resolutions in other regions of the display 625.

The I/O interface 615 is a device that allows a user to send action requests and receive responses from the console 610. An action request is a request to perform a particular action. For example, an action request may be an instruction to start or end capture of image or video data or an instruction to perform a particular action within an application. The I/O interface 615 may include one or more input devices. Example input devices include: a keyboard, a mouse, a game controller, or any other suitable device for receiving action requests and communicating the action requests to the console 610. An action request received by the I/O interface 615 is communicated to the console 610, which performs an action corresponding to the action request. In some embodiments, the I/O interface 615 includes an IMU 640 that captures calibration data indicating an estimated position of the I/O interface 615 relative to an initial position of the I/O interface 615. In some embodiments, the I/O interface 615 may provide haptic feedback to the user in accordance with instructions received from the console 610. For example, haptic feedback is provided when an action request is received, or the console 610 communicates instructions to the I/O interface 615 causing the I/O interface 615 to generate haptic feedback when the console 610 performs an action.

The console 610 provides content to the NED 605 for processing in accordance with information received from one or more of: the DCA 620, the NED 605, and the I/O interface 615. In the example shown in FIG. 6, the console 610 includes an application store 655, a tracking module 660, and an engine 665. Some embodiments of the console 610 have different modules or components than those described in conjunction with FIG. 6. Similarly, the functions further described below may be distributed among components of the console 610 in a different manner than described in conjunction with FIG. 6.

The application store 655 stores one or more applications for execution by the console 610. An application is a group of instructions, that when executed by a processor, generates content for presentation to the user. Content generated by an application may be in response to inputs received from the user via movement of the NED 605 or the I/O interface 615. Examples of applications include: gaming applications, conferencing applications, video playback applications, or other suitable applications.

The tracking module 660 calibrates the NED system 600 using one or more calibration parameters and may adjust one or more calibration parameters to reduce error in determination of the position of the NED 605 or of the I/O interface 615. For example, the tracking module 660 communicates a calibration parameter to the DCA 620 to adjust the focus of the DCA 620 to more accurately determine positions of structured light elements captured by the DCA 620. Calibration performed by the tracking module 660 also accounts for information received from the IMU 640 in the NED 605 and/or an IMU 640 included in the I/O interface 615. Additionally, if tracking of the NED 605 is lost (e.g., the DCA 620 loses line of sight of at least a threshold number of structured light elements), the tracking module 660 may re-calibrate some or all of the NED system 600.

The tracking module 660 tracks movements of the NED 605 or of the I/O interface 615 using information from the DCA 620, the one or more position sensors 635, the IMU 640 or some combination thereof. For example, the tracking module 660 determines a position of a reference point of the NED 605 in a mapping of a local area based on information from the NED 605. The tracking module 660 may also determine positions of the reference point of the NED 605 or a reference point of the I/O interface 615 using data indicating a position of the NED 605 from the IMU 640 or using data indicating a position of the I/O interface 615 from an IMU 640 included in the I/O interface 615, respectively. Additionally, in some embodiments, the tracking module 660 may use portions of data indicating a position or the NED 605 from the IMU 640 as well as representations of the local area from the DCA 620 to predict a future location of the NED 605. The tracking module 660 provides the estimated or predicted future position of the NED 605 or the I/O interface 615 to the engine 665.

The engine 665 generates a 3D mapping of the area surrounding the NED 605 (i.e., the "local area") based on information received from the NED 605. In some embodiments, the engine 665 determines depth information for the 3D mapping of the local area based on information received from the DCA 620 that is relevant for techniques used in computing depth. The engine 665 may calculate depth information using one or more techniques in computing depth (e.g., structured light, time of flight, or some combination thereof). In various embodiments, the engine 665 uses different types of information determined by the DCA 620 or a combination of types of information determined by the DCA 620.

The engine 665 also executes applications within the NED system 600 and receives position information, acceleration information, velocity information, predicted future positions, or some combination thereof, of the NED 605 from the tracking module 660. Based on the received information, the engine 665 determines content to provide to the NED 605 for presentation to the user. For example, if the received information indicates that the user has looked to the left, the engine 665 generates content for the NED 605 that mirrors the user's movement in a virtual environment or in an environment augmenting the local area with additional content. Additionally, the engine 665 performs an action within an application executing on the console 610 in response to an action request received from the I/O interface 615 and provides feedback to the user that the action was performed. The provided feedback may be visual or audible feedback via the NED 605 or haptic feedback via the I/O interface 615.

In some embodiments, based on the eye tracking information (e.g., orientation of the user's eye) received from the eye tracking system 645, the engine 665 determines resolution of the content provided to the NED 605 for presentation to the user on the display 625. The engine 665 provides the content to the NED 605 having a maximum resolution on the display 625 in a foveal region of the user's gaze, whereas the engine 665 provides a lower resolution in other regions of the display 625, thus achieving less power consumption at the NED 605 and saving computing cycles of the console 610 without compromising a visual experience of the user. In some embodiments, the engine 665 can further use the eye tracking information to adjust where objects are displayed on the display 625 to prevent the VAC.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A near-eye display (NED) comprising:
a plurality of focal adjustment lenses in a display assembly, each of the focal adjustment lenses imparts a respective amount of optical power to the display assembly, and different combinations of one or more of the focal adjustment lenses being associated with different focal distances; and
a plurality of waveguide displays in the display assembly arranged in optical series and configured to emit light in accordance with multifocal instructions generated based on information about a gaze direction for an eye of a user of the NED, each of the waveguide displays is separated from one or more adjacent waveguide displays of the plurality of waveguide displays by one or more of the plurality of focal adjustment lenses, and each of the waveguide displays is associated with a unique combination of one or more of the focal adjustment lenses and a corresponding focal distance at which image light is presented to the user,
wherein the display assembly is configured to emit the image light at an effective focal distance determined based on the information about the gaze direction in accordance with the multifocal instructions.

2. The NED of claim 1, further comprises:
a corrective optical element coupled to a waveguide display of the plurality of waveguide displays furthest from an eye-box of the eye, wherein
the corrective optical element is selected such that an optical power of combination of the plurality of focal adjustment lenses and the corrective optical element is zero.

3. The NED of claim 1, further comprises:
an eye tracking system that determines eye tracking information including information about the gaze direction for the eye; and
a multifocal module configured to:
determine a focal distance associated with the eye, based in part on the eye tracking information,
select a waveguide display of the plurality of waveguide displays, based in part on the determined focal distance, and
instruct the selected waveguide display to emit the light in accordance with the multifocal instructions.

4. The NED of claim 1, wherein each focal adjustment lens of the plurality of focal adjustment lenses is a concave lens having a negative optical power.

5. The NED of claim 1, wherein:
one of the plurality of focal adjustment lenses closest to an eye-box of the eye is a concave lens having a negative optical power; and
each remaining focal adjustment lens of the plurality of focal adjustment lenses is a convex lens having a positive optical power.

6. The NED of claim 1, wherein at least one focal adjustment lens of the plurality of focal adjustment lenses is a liquid crystal lens having a corresponding optical power adjustable in accordance with the multifocal instructions.

7. The NED of claim 1, wherein at least one focal adjustment lens of the plurality of focal adjustment lenses is a liquid lens having a corresponding optical power adjustable in accordance with the multifocal instructions.

8. The NED of claim 1, further comprises:
a corrective optical element coupled to a waveguide display of the plurality of waveguide displays furthest from an eye-box of the eye, wherein the corrective optical element comprises a liquid crystal lens having a variable optical power; and
a multifocal module configured to adjust the variable optical power of the corrective optical element based in part on the multifocal instructions such that an optical power of combination of the plurality of focal adjustment lenses and the corrective optical element is zero.

9. The NED of claim 1, further comprises:
a multifocal module configured to adjust focus of the image light presented to the user by controlling, based in part on the multifocal instructions, an optical power of at least one focal adjustment lens of the plurality of focal adjustment lenses, the at least one focal adjustment lens implemented as a liquid crystal lens having a variable optical power.

10. A display assembly comprising:
a plurality of focal adjustment lenses, each of the focal adjustment lenses imparts a respective amount of optical power to the display assembly, and different combinations of one or more of the focal adjustment lenses being associated with different focal distances; and
a plurality of waveguide displays arranged in optical series and configured to emit light in accordance with multifocal instructions generated based on information about a gaze direction for an eye of a user, each of the waveguide displays is separated from one or more adjacent waveguide displays of the plurality of waveguide displays by one or more of the plurality of focal adjustment lenses, and each of the waveguide displays is associated with a unique combination of one or more of the focal adjustment lenses and a corresponding focal distance.

11. The display assembly of claim 10, further comprises:
a corrective optical element coupled to a waveguide display of the plurality of waveguide displays, wherein the corrective optical element is selected such that an optical power of combination of the plurality of focal adjustment lenses and the corrective optical element is zero.

12. The display assembly of claim 10, wherein each focal adjustment lens of the plurality of focal adjustment lenses is a concave lens having a negative optical power.

13. The display assembly of claim 10, wherein:
one of the plurality of focal adjustment lenses is a concave lens having a negative optical power; and
each remaining focal adjustment lens of the plurality of focal adjustment lenses is a convex lens having a positive optical power.

14. The display assembly of claim 10, wherein at least one focal adjustment lens of the plurality of focal adjustment lenses is a liquid crystal lens having an adjustable optical power.

15. The display assembly of claim 10, wherein at least one focal adjustment lens of the plurality of focal adjustment lenses is a liquid lens having an adjustable optical power.

16. The display assembly of claim 10, further comprises:
a corrective optical element coupled to a waveguide display of the plurality of waveguide displays, wherein
the corrective optical element comprises a liquid crystal lens having a variable optical power adjusted such that an optical power of combination of the plurality of focal adjustment lenses and the corrective optical element is zero.

17. A near-eye display (NED) comprising:
a plurality of focal adjustment lenses in a display assembly, each of the focal adjustment lenses imparts a respective amount of optical power to the display assembly, and different combinations of one or more of the focal adjustment lenses being associated with different focal distances;
a plurality of waveguide displays in the display assembly arranged in optical series and configured to emit light in accordance with multifocal instructions generated based on information about a gaze direction for an eye of a user of the NED, each of the waveguide displays is separated from one or more adjacent waveguide displays of the plurality of waveguide displays by one or more of the plurality of focal adjustment lenses, and each of the waveguide displays is associated with a unique combination of one or more of the focal adjustment lenses and a corresponding focal distance at which image light is presented to the user;
an eye tracking system that determines eye tracking information including information about the gaze direction for the eye; and
a multifocal module configured to:
generate the multifocal instructions based on the eye tracking information, and
provide the multifocal instructions to the display assembly to emit the image light at an effective focal distance determined based on the information about the gaze direction in accordance with the multifocal instructions.

18. The NED of claim 17, wherein the multifocal module is further configured to:
determine a focal distance associated with the eye, based in part on the eye tracking information;
select a waveguide display of the plurality of waveguide displays, based in part on the determined focal distance; and
instruct the selected waveguide display to emit the light in accordance with the multifocal instructions.

19. The NED of claim 17, wherein each focal adjustment lens of the plurality of focal adjustment lenses is a concave lens having a negative optical power.

20. The NED of claim 17, wherein at least one focal adjustment lens of the plurality of focal adjustment lenses is a liquid crystal lens or a liquid lens having a corresponding optical power adjustable in accordance with the multifocal instructions.

* * * * *